(12) United States Patent
Solomon et al.

(10) Patent No.: US 6,408,233 B1
(45) Date of Patent: Jun. 18, 2002

(54) GPS DATA LOGGER WITH AUTOMATIC WIRELESS DOWNLOAD

(75) Inventors: Gary Robert Solomon, Mission Viejo; Benjamin Robert Wahlquist, Fullerton; Gary Edward Stoermer, Placentia, all of CA (US)

(73) Assignee: Axiom Navigation, Inc., Anaheim, CA (US)

( * ) Notice: Subject to any disclaimer, the term of this patent is extended or adjusted under 35 U.S.C. 154(b) by 0 days.

(21) Appl. No.: 09/664,149

(22) Filed: Sep. 18, 2000

(51) Int. Cl.[7] .............................. G06F 7/00; G06F 19/00
(52) U.S. Cl. ........................... 701/35; 701/29; 701/213; 340/991
(58) Field of Search ............................. 701/24, 26, 35, 701/213, 214, 215, 29; 73/178 R; 340/438, 988, 991; 455/456

(56) References Cited

U.S. PATENT DOCUMENTS

| | | | |
|---|---|---|---|
| 5,450,344 A | | 9/1995 | Woo et al. |
| 5,559,520 A | * | 9/1996 | Barzegar et al. ............ 342/357 |
| 5,612,875 A | | 3/1997 | Haendel et al. |
| 5,721,540 A | | 2/1998 | Ellis |
| 5,721,678 A | | 2/1998 | Widl |
| 5,805,079 A | | 9/1998 | Lemelson |
| 5,852,790 A | | 12/1998 | Hayes et al. |
| 5,861,841 A | | 1/1999 | Gildea et al. |
| 5,918,180 A | | 6/1999 | Dimino |
| 5,919,239 A | | 7/1999 | Fraker et al. |
| 5,955,942 A | | 9/1999 | Slifkin et al. |
| 5,996,702 A | * | 12/1999 | Hall ............................ 172/4.5 |
| 6,088,636 A | * | 7/2000 | Chigumira et al. ........... 701/26 |

* cited by examiner

Primary Examiner—Gertrude Arthur
(74) Attorney, Agent, or Firm—O'Melveny & Myers LLP

(57) ABSTRACT

There is provided an automated download vehicle monitoring system for use with a vehicle. The monitoring system is provided with a GPS receiver which is installed in the vehicle. The GPS receiver is configured to receive a GPS locational signal. The monitoring system is further provided with a data logger which is configured to store logged data therein. The data logger is in electrical communication with the GPS receiver for receiving therefrom GPS locational data representative of the received GPS locational signal. The data logger is configured to incorporate the received GPS locational data with the logged data. The monitoring system is further provided with a download controller which is in electrical communication with the data logger for retrieving logged data therefrom. The download controller is configured to determine a vehicle location of the vehicle based upon the received GPS locational signal. The download controller is configured to determine a vehicle distance between the vehicle location and a base station location. The monitoring system is further provided with a vehicle download transmitter which is in electrical communication with the download controller. The vehicle download transmitter is configured to automatically transmit the logged data in response to the determined vehicle distance being less than a predetermined download distance. The monitoring system is further provided with a base station receiver which is configured to receive the transmitted logged data from the vehicle download transmitter.

27 Claims, 1 Drawing Sheet

GPS DATA LOGGER WITH AUTOMATIC WIRELESS DOWNLOAD

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to GPS vehicle monitoring systems, and more particularly to a vehicle monitoring system having an automatic download feature.

The use of global positioning systems (GPS) for the monitoring of vehicles is well known. GPS derived data is particularly useful for the management of commercial fleet vehicles. Typical vehicle monitoring systems include a GPS receiver which is installed in the vehicle. The GPS receiver is configured to receive GPS locational signals. Locational data representative of such received GPS locational signals is stored in a data logger, e.g., a computer memory device. Other data may be collected concerning the operation of the vehicle which is correlated with the stored locational data. The removable memory is then physically transported to a base station computer for downloading. Once downloaded, such data may be processed and analyzed. In this respect, such data may be useful to improve fleet resource efficiency, and therefore productivity.

It is contemplated that fleet vehicles typically operate from a base station. Upon leaving the base station, the monitoring system would collect the GPS based locational and other data. Upon returning to the vehicle base station, a typical procedure would call for the vehicle operator to participate in the transfer of the logged data. Some systems utilize a removable memory, such as diskette or data pack, to facilitate this process. In this regard, upon returning to the base station, the vehicle operator would be assigned to task of physically retrieving the removable memory and turning it in for downloading and processing by the base station computer. Alternatively, some monitoring devices installed in the vehicles may download logged data by directly connecting a computer cable for transferring the logged data to an intermediate computer storage device. The intermediate computer storage device would in turn be taken to the base station computer for further downloading and processing.

Of the variety of uses for such logged data, the vehicle operator's actions may be analyzed to ensure that the vehicle operator has followed proper procedures. Such procedures may include obeying speed regulations or only utilizing vehicles for work-related purposes, for example. In this respect, as the logged data represents, in part, the monitoring of the vehicle operator's actions which is later scrutinized, vehicle operators may not appreciate having to perform this data retrieval task. This may in turn foster negative moral amongst the vehicle operators. An alternate arrangement may call for a technician, rather than the vehicle operator, to be assigned the task of transferring the logged data for downloading. However, this is would necessarily require the additional resources associated with such a technician.

It is therefore evident that there exists a need in the art for a vehicle monitoring system having improved logged data transfer characteristics in comparison to the prior art.

SUMMARY OF THE INVENTION

In accordance with the present invention, there is provided an automated download vehicle monitoring system for use with a vehicle. The monitoring system is provided with a GPS receiver which is installed in the vehicle. The GPS receiver is configured to receive a GPS locational signal. The monitoring system is further provided with a data logger which is configured to store logged data therein. The data logger is in electrical communication with the GPS receiver for receiving therefrom GPS locational data representative of the received GPS locational signal. The data logger being configured to incorporate the received GPS locational data with the logged data. The monitoring system is further provided with a download controller which is in electrical communication with the data logger for retrieving logged data therefrom. The download controller is configured to determine a vehicle location of the vehicle based upon the received GPS locational signal. The download controller is configured to determine a vehicle distance between the vehicle location and a base station location. The monitoring system is further provided with a vehicle download transmitter which is in electrical communication with the download controller. The vehicle download transmitter is configured to automatically transmit the logged data in response to the determined vehicle distance being less than a predetermined download distance. The monitoring system is further provided with a base station receiver which is configured to receive the transmitted logged data from the vehicle download transmitter. In this regard, the logged data is advantageously downloaded via an automatic wireless process.

The logged data may include time based data correlated with the GPS locational data. Further, the logged data may include event based data correlated with the GPS locational data. Such event based data may be related to input signals received from within the vehicle. Additionally, the logged data may include vehicle distance traveled based data correlated with the GPS locational data.

In the preferred embodiment of the present invention, the vehicle download transmitter is a radio frequency based device. Further, the vehicle download transmitter may be configured to be operative over multiple radio frequency channels to communicate with the base station receiver. Further still, the vehicle download transmitter may utilize time division multiple access to communicate with the base station receiver. In another embodiment of the present invention, the vehicle download transmitter is a cellular based device.

In another embodiment of the present invention, a plurality of monitoring devices may be installed in a plurality of vehicles. Each of the monitoring device including a GPS receiver, a data logger, a download controller and a vehicle download transmitter, all as described above. The monitoring devices are configured to communicate to a common base station receiver. In this regard, the monitoring devices may communicate with the base station receiver utilizing multiple radio frequency channels and time division multiple access to efficiently download the logged data from the various associated vehicles. As such, the present invention is particularly appropriate for fleet management purposes.

As such, based on the foregoing, the present invention mitigates the inefficiencies and limitations associated with prior art vehicle monitoring systems and represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
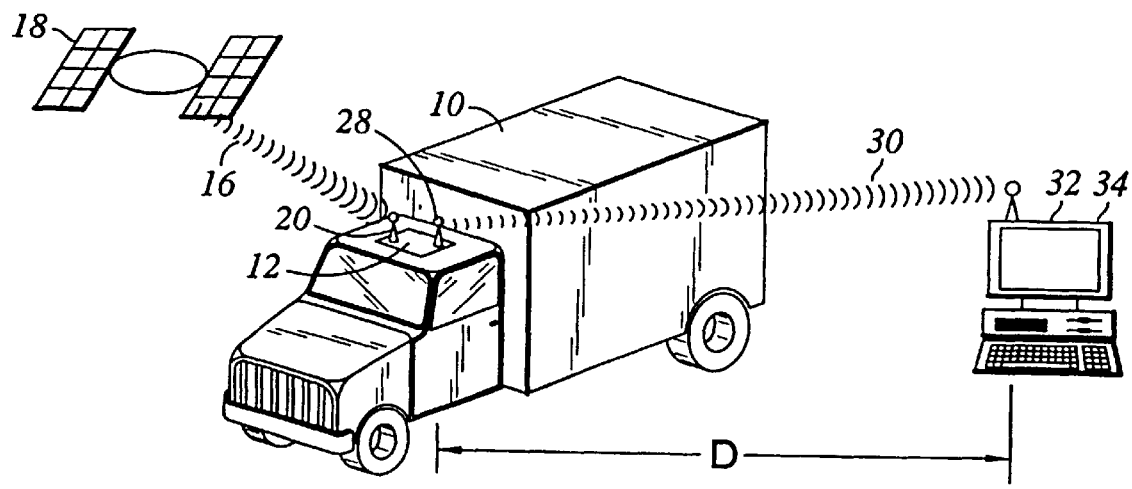
FIG. 1 symbolically depicts the automated download vehicle monitoring system of the present invention.
Figure 2:
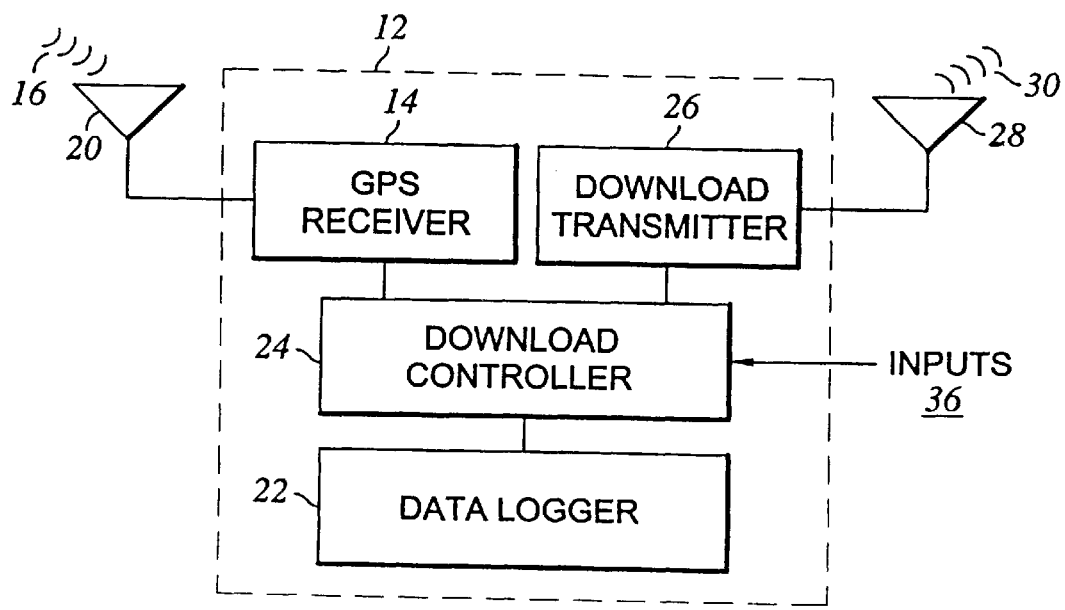
FIG. 2 is a schematic diagram of the vehicle monitoring device as installed in the vehicle of FIG. 1.

Referring now to the drawings wherein the showings are for purposes of illustrating a preferred embodiment of the present invention only, and not for purposes of limiting the same, FIGS. 1 and 2 illustrate the automated download vehicle monitoring system of the present invention.

In accordance with the present invention, there is provided an automated download vehicle monitoring system for use with a vehicle 10. As used herein, the term vehicle 10 shall refer to singular and/or the plural (e.g., a fleet of vehicles).

A vehicle monitoring device 12 is installed in the vehicle 10. The vehicle monitoring device 12 is provided with a GPS receiver 14 which is thus installed in the vehicle 12. The GPS receiver 14 is configured to receive a GPS locational signal 16. In this regard, FIG. 1 symbolically depicts a Global Positioning System (GPS) satellite 18. The vehicle monitoring device 12 is provided with a GPS antenna 20 which is configured to facilitate the receipt of the GPS location signal 16 by the GPS receiver 14. It is contemplated the GPS receiver 14 and GPS antenna 20 may be chosen from those which are well known to one of ordinary skill in the art.

The vehicle monitoring device 12 is further provided with a data logger 22 which is configured to store logged data therein. It is contemplated that the data logger 22 may be chosen from any of those computer memory devices which are well known to one of ordinary skill in the art. In the preferred embodiment of the present invention, a non-volatile memory is utilized. The data logger 22 is in electrical communication with the GPS receiver 14 for receiving therefrom GPS locational data representative of the received GPS locational signal 16. The data logger 22 is configured to incorporate the received GPS locational data with the logged data.

The vehicle monitoring device 12 is further provided with a download controller 24 which is in electrical communication with the data logger 22 for retrieving logged data therefrom. The download controller 24 may be any type of digital processing device, such as a microprocessor. Importantly, the download controller 24 is configured to determine a vehicle location of the vehicle 10 based upon the received GPS locational signal 16. In addition, the download controller 24 is configured to determine a vehicle distance (D) between the vehicle location and a base station location.

The vehicle monitoring device 12 is further provided with a vehicle download transmitter 26 which is in electrical communication with the download controller 24. The vehicle download transmitter 26 is configured to automatically transmit the logged data in response to the determined vehicle distance (D) being less than a predetermined download distance. Such predetermined download distance may be chosen to 200 meters, so as to generally correspond to the vehicle 10 returning to the base station, for example. The vehicle monitoring device 12 is provided with a download antenna 28 which is configured to facilitate the transmission of transmitted logged data 30. It is contemplated the vehicle download transmitter 26 and download antenna 28 may be chosen from those which are well known to one of ordinary skill in the art. The monitoring system is further provided with a base station receiver 32 which is configured to receive the transmitted logged data 30 from the vehicle download transmitter 26. The base station receiver 32 is located at the base station location. Advantageously, the logged data is thus downloaded via an automatic wireless process. The base station receiver 32 electrically communicates with a processing computer 34. In this regard, the transmitted logged data 30 may be analyzed and reported as desired.

The logged data may include time based data correlated with the GPS locational data. Further, the logged data may include event based data correlated with the GPS locational data. Such event based data may be related to input signals 36 received from within the vehicle 10, such as data representative of vehicle speed, excess of certain speeds, opening of a vehicle door, activation of a vehicle anti-theft alarm, ignition of the vehicle, stoppage of the vehicle in excess of a predetermined amount of time, for example. Additionally, the logged data may include vehicle distance traveled based data correlated with the GPS locational data.

In the preferred embodiment of the present invention, the vehicle download transmitter 26 is a radio frequency based device. Further, the vehicle download transmitter 26 may be configured to be operative over multiple radio frequency channels to communicate with the base station receiver 32. Further still, the vehicle download transmitter 26 may utilize time division multiple access to communicate with the base station receiver 32. In another embodiment of the present invention, the vehicle download transmitter 26 is a cellular based device.

In another embodiment of the present invention, a plurality of vehicle monitoring devices 12 may be installed in a plurality of vehicles 10. The vehicle monitoring devices 12 may be configured to communicate to a common base station receiver 32. In this regard, the vehicle monitoring devices 12 may communicate with the base station receiver utilizing multiple radio frequency channels and time division multiple access to efficiently download the logged data from the various associated vehicles 10. As such, the present invention is particularly appropriate for fleet management purposes.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An automated download vehicle monitoring system for use with a vehicle, the monitoring system comprising:
   a GPS receiver installed in the vehicle, the GPS receiver being configured to receive a GPS locational signal;
   a data logger configured to store logged data therein, the data logger being in electrical communication with the GPS receiver for receiving therefrom GPS locational data representative of the received GPS locational signal, the data logger being configured to incorporate the received GPS locational data with the logged data;
   a download controller in electrical communication with the data logger for retrieving logged data therefrom, the download controller being configured to determine a location of the vehicle based upon the received GPS locational signal, the download controller being configured to determine a distance between the vehicle location and a base station location;
   a vehicle download transmitter in electrical communication with the download controller, the vehicle download transmitter being configured to automatically transmit the logged data in response to the determined vehicle distance being less than a predetermined download distance; and a base station receiver configured to receive the transmitted logged data from the vehicle download transmitter.

2. The monitoring system of claim 1 wherein the logged data includes time based data correlated with the GPS locational data.

3. The monitoring system of claim 1 wherein the logged data includes event based data correlated with the GPS locational data.

4. The monitoring system of claim 3 wherein the event based data is related to input signals received from within the vehicle.

5. The monitoring system of claim 1 wherein the logged data includes vehicle distance traveled based data correlated with the GPS locational data.

6. The monitoring system of claim 1 wherein the vehicle download transmitter is a radio frequency based device.

7. The monitoring system of claim 6 wherein the vehicle download transmitter is operative over multiple radio frequency channels to communicate with the base station receiver.

8. The monitoring system of claim 1 wherein the vehicle download transmitter utilizes time division multiple access to communicate with the base station receiver.

9. The monitoring system of claim 1 wherein the vehicle download transmitter is a cellular based device.

10. An automated download fleet monitoring system for use with a plurality of vehicles, the monitoring system comprising:

a plurality of monitoring devices installed in each of the plurality of vehicles, each monitoring device comprising:

a GPS receiver configured to receive a GPS locational signal;

a data logger configured to store logged data therein, the data logger being in electrical communication with the GPS receiver for receiving therefrom GPS locational data representative of the received GPS locational signal, the data logger being configured to incorporate the received GPS locational data with the logged data;

a download controller in electrical communication with the data logger for retrieving logged data therefrom, the download controller being configured to determine a location of the vehicle in which it is installed based upon the received GPS locational signal, the download controller being configured to determine a distance between the vehicle location and a base station location;

a vehicle download transmitter in electrical communication with the download controller, the vehicle download transmitter being configured to automatically transmit the logged data in response to the determined vehicle distance being less than a predetermined download distance; and a base station receiver configured to receive the transmitted logged data from each of vehicle download transmitters.

11. The monitoring system of claim 10 wherein the logged data includes time based data correlated with the GPS locational data.

12. The monitoring system of claim 10 wherein the logged data includes event based data correlated with the GPS locational data.

13. The monitoring system of claim 12 wherein the event based data is related to input signals received from within the associated vehicle.

14. The monitoring system of claim 10 wherein the logged data includes vehicle distance traveled based data correlated with the GPS locational data.

15. The monitoring system of claim 10 wherein the vehicle download transmitter is a radio frequency based device.

16. The monitoring system of claim 15 wherein the vehicle download transmitter is operative over multiple radio frequency channels to communicate with the base station receiver.

17. The monitoring system of claim 10 wherein the vehicle download transmitter utilizes time division multiple access to communicate with the base station receiver.

18. The monitoring system of claim 10 wherein the vehicle download transmitter is a cellular based device.

19. An automated download vehicle monitoring system for use with a vehicle in association with a base station, the monitoring system comprising:

a GPS receiver for receiving a GPS locational signal and generating GPS locational data;

a data logger configured to store logged data therein, the data logger being in communication with the GPS receiver for receiving the GPS locational data, the data logger being configured to incorporate the received GPS locational data with the logged data;

a download controller operatively connected with the data logger for retrieving the logged data therefrom, the download controller being configured to determine a location of the vehicle based upon the received GPS locational signal, the download controller being configured to determine a distance between the vehicle location and the base station; and a vehicle download transmitter operatively connected with the download controller, the vehicle download transmitter being configured to automatically transmit to the base station the logged data in response to the determined vehicle distance being less than a predetermined download distance.

20. The monitoring system of claim 19 wherein the logged data includes time based data correlated with the GPS locational data.

21. The monitoring system of claim 19 wherein the logged data includes event based data correlated with the GPS locational data.

22. The monitoring system of claim 21 wherein the event based data is related to input signals received from within the vehicle.

23. The monitoring system of claim 19 wherein the logged data includes vehicle distance traveled based data correlated with the GPS locational data.

24. The monitoring system of claim 19 wherein the vehicle download transmitter further comprises a radio frequency transmitter.

25. The monitoring system of claim 24 wherein the vehicle download transmitter is operative over multiple radio frequency channels to communicate with the base station.

26. The monitoring system of claim 24 wherein the vehicle download transmitter utilizes time division multiple access signals to communicate with the base station.

27. The monitoring system of claim 19 wherein the vehicle download transmitter further comprises a cellular communication device.

* * * * *